(12) United States Patent
Gururaj et al.

(10) Patent No.: US 11,809,406 B2
(45) Date of Patent: Nov. 7, 2023

(54) EVENT RECORDS IN A LOG FILE

(71) Applicant: Hewlett Packard Enterprise Development LP, Houston, TX (US)

(72) Inventors: Prabhanjan Gururaj, Karnataka (IN); Shreyas Prabhakar Gaikwad, Karnataka (IN); Yashashvi Tarana, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 217 days.

(21) Appl. No.: 17/229,526

(22) Filed: Apr. 13, 2021

(65) Prior Publication Data

US 2022/0156247 A1    May 19, 2022

(30) Foreign Application Priority Data

Nov. 19, 2020  (IN) .............................. 202041050480

(51) Int. Cl.
 *G06F 16/00*  (2019.01)
 *G06F 16/23*  (2019.01)
 *G06F 16/17*  (2019.01)

(52) U.S. Cl.
 CPC ...... *G06F 16/2365* (2019.01); *G06F 16/1734* (2019.01)

(58) Field of Classification Search
 CPC .......................... G06F 16/2365; G06F 16/1734
 USPC ........................................................ 707/690
 See application file for complete search history.

(56) References Cited

U.S. PATENT DOCUMENTS

| | | | |
|---|---|---|---|
| 9,697,100 B2 | 7/2017 | Puri et al. | |
| 2006/0150163 A1* | 7/2006 | Chandane | G06F 11/3612 717/131 |
| 2008/0140479 A1* | 6/2008 | Mello | G06Q 30/0201 705/14.54 |
| 2011/0145185 A1* | 6/2011 | Wang | H04L 41/147 706/52 |
| 2011/0307502 A1* | 12/2011 | Boctor | G06F 8/37 707/758 |
| 2013/0204663 A1* | 8/2013 | Kahlow | H04L 67/535 705/7.31 |
| 2014/0315610 A1* | 10/2014 | Shachar | G06T 7/20 463/7 |
| 2015/0106311 A1* | 4/2015 | Birdwell | G06N 3/063 706/26 |
| 2016/0277268 A1* | 9/2016 | Brown | G06F 11/3075 |
| 2017/0091811 A1* | 3/2017 | Saxena | G06Q 30/0277 |
| 2017/0153936 A1 | 6/2017 | Vorganti | |
| 2018/0165173 A1* | 6/2018 | Lin | G06F 16/285 |
| 2019/0073257 A1 | 3/2019 | Dasgupta et al. | |
| 2019/0228085 A1 | 7/2019 | Biswas et al. | |

(Continued)

OTHER PUBLICATIONS

Zhang, E., "What is Log Analysis? Use Cases, Best Practices, and More",available online at <https://digitalguardian.com/blog/what-log-analysis-use-cases-best-practices-and-more>, Sep. 12, 2018, 10 Pages.

*Primary Examiner* — Vincent F Boccio
(74) *Attorney, Agent, or Firm* — Hewlett Packard Enterprise Patent Department

(57) ABSTRACT

Examples of analyzing a log file are described. In an example, a log file comprising a plurality of event records is obtained from a computing device. The event records in the plurality of log files may be processed. Thereafter, an occurrence of anomaly in the log file may be ascertained.

20 Claims, 6 Drawing Sheets

(56) References Cited

U.S. PATENT DOCUMENTS

2020/0314127 A1* 10/2020 Wilson .................... H04L 43/16
2022/0303284 A1*  9/2022 Al Qasimi .......... G06F 21/6236

* cited by examiner

EVENT RECORDS IN A LOG FILE

BACKGROUND

A log file may record information pertaining to a computing event that may occur as a result of an operation executing on a computing system. Such information may be provided as a plurality of event records. Since the log file includes information related to the operation of the computing system under consideration, it may be used for detecting and identifying occurrence of anomalous behavior of either the computing system, or component or module of the computing system. The log file may be analyzed either manually or through programmed computing devices.

BRIEF DESCRIPTION OF FIGURES

Systems and/or methods, in accordance with examples of the present subject matter are now described, by way of example, and with reference to the accompanying figures, in which.

DETAILED DESCRIPTION

Figure 1:
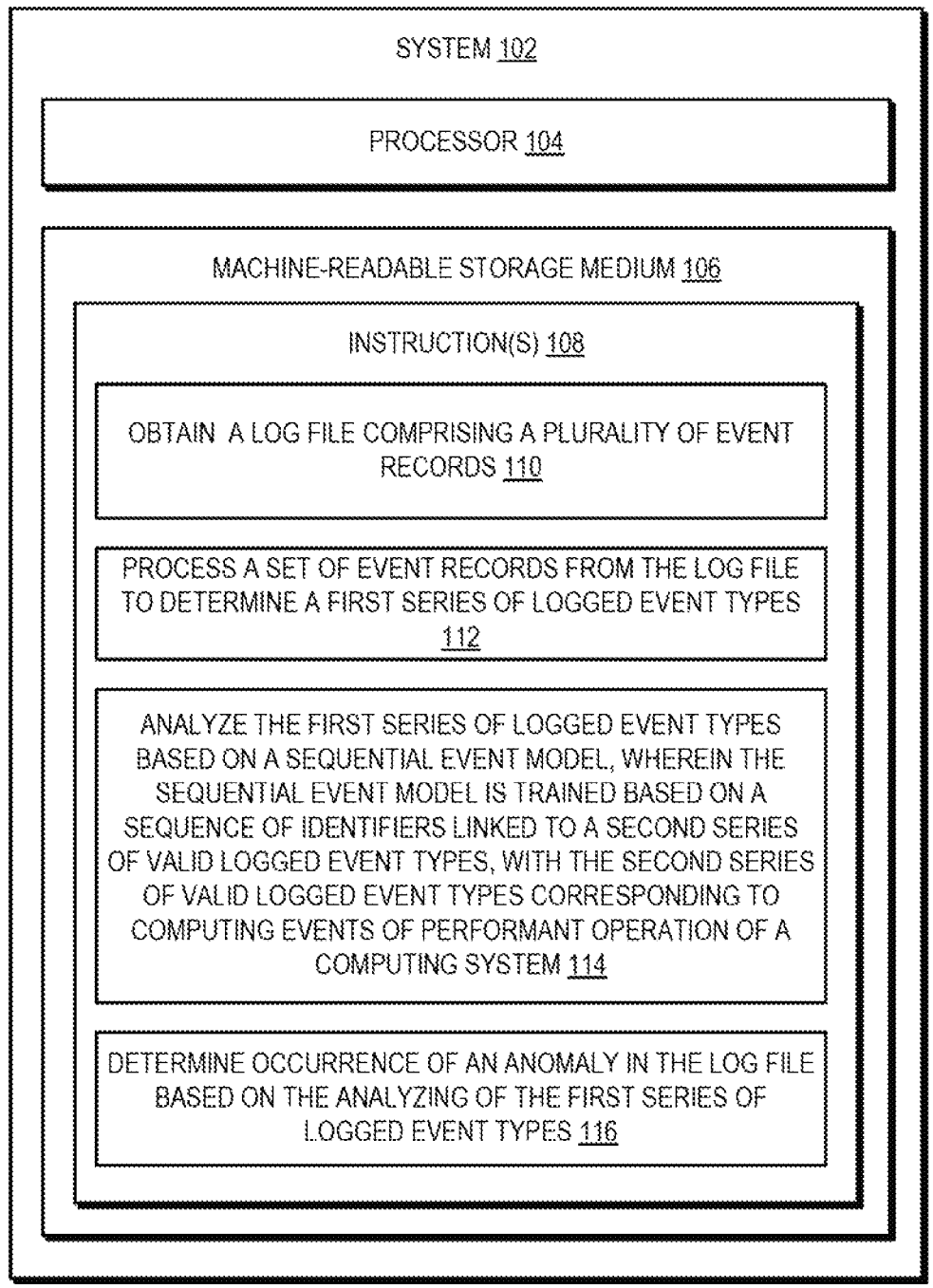
FIG. 1 illustrates a computing system for training a sequential event model, as per an example.

Log files may be utilized to gain insights into an operating state of a computing device or a computing system. A log file may include a plurality of event records, which may capture and represent values or indicators for different computing events. Computing events may include certain computing related operations that may execute during the operation of the computing system under consideration. As may be understood, values pertaining to the different computing events (hereinafter referred to as events) may lie within certain limits during a performant operation of the computing system.

A computing device may be considered as being in a performant operation state when the computing device operates in an expected and functionally stable state. In cases where the computing device is operating in an unexpected manner, the operation of the computing device may result in anomalous events (or anomalies). An anomaly, in such a case, may be considered as a deviation from a series of events which may otherwise occur during a performant operation of the computing device. An anomaly may also pertain to occurrence of events having out-of-bound values of certain operational or configuration parameters of a given computing device. As may be understood, such anomalies may occur as a result of an underlying cause. Since the log files and the event records bear information pertaining to the operation of the computing device, the log files and the event records may be analyzed to determine the underlying root cause which may be resulting in the anomalous operation or anomalous behavior of the computing system.

The computing system may generate large volumes of log files. A root cause analysis, to determine the cause behind the anomaly, based on such large volumes of log file is a complex and laborious task, which usually involves reviewing a multitude of log files at a time. Furthermore, even in cases where a log file indicating the anomaly is traced, it may not be possible to determine the root cause which may have resulted in the anomaly, based solely on the traced log file. The complexity of determining the root cause behind the anomaly may get further compounded in cases where the computing system may include multiple modules or computing devices. Event records of such multiple computing devices may be correlated thereby aggravating the complexity of determining the root cause behind the anomalous working of the computing system.

Approaches for determining occurrence of an anomaly based on analysis of a log file generated by a computing device are described. A sequence in which events occur may remain consistent during a performant operation of the computing device. An event may correspond to a number of computing operations that may be executed by the computing device. A deviation in the sequence of events may indicate the occurrence of an anomaly. The present approaches, as per the following examples, determine whether occurrence of an event conforms to the sequence of events occurring during the performant operation of the computing device under consideration.

In an example, a log file comprising a plurality of event records may be obtained. The event records may include a static portion which defines a template or a structure of the event records, and a mutable portion. Typically, the static portion remains consistent across same event types. In an example, with the event records are obtained, the event records may be parsed to obtain the static portion of the event records. Based on the static portion, an event type corresponding to each of the event records may be determined. The mutable portion in turn, specifies the event attributes or values qualifying the corresponding event.

Continuing with the present example, the above process may be repeated for each of the event records within the log file to obtain a first series of logged event types. A series of event types corresponds to an order of events that were generated as a result of the operation of the computing device. Having obtained the first series of logged event types, each event type within the first series may be associated with a numeric identifier. Subsequently, a series of numeric identifiers is generated that corresponds to the first series of logged event types.

Once associated with corresponding numerical identifiers, the first series of logged event types may be analyzed using a sequential event model. In an example, the sequential event model may be a neural network model that is trained based on a sequence of identifiers linked to a second series of valid logged event types. The second series of valid logged event types may correspond to computing events of performant operation of a computing system. As opposed to the numeric identifiers, the first series of logged event types and the event records may include alphanumeric characters. Processing such alphanumeric-based information is likely to be more complex and computationally extensive, when compared to processing any numeric-based information. Considering this, analyzing the log files and the corresponding event records based on the series of numeric identifiers (which in turn are associated with the first series of logged event types) is therefore likely to be less computationally extensive, and faster in comparison to analyzing the log files and the corresponding event records.

The analysis of the first series of logged event types based on the sequential event model is to determine deviations from the performant operation of the computing system. In an example, a deviation determined within the first series of logged event types based on the sequential event model indicates the presence of an anomaly. With the presence of an anomaly is ascertained, an appropriate event record may be identified, and an underlying root cause may be accordingly determined. In an example, the sequential event model may be based on recurrent neural network model.

In one example, an anomaly may also appear in the form of out-of-bound values of certain operational or configuration parameters of a given computing device. Detecting presence of such out-of-bound values may be utilized for assessing occurrence of an anomaly. In an example, event attributes corresponding to an event record may be processed. The event attributes may be determined based on the mutable portion of the event record. Further, the event attributes may be clustered into a plurality of clusters. The plurality of clusters are such that each cluster is defined by data points corresponding to different events. Instances of event attributes falling within any one of the plurality of clusters may be indicative of performant operation of the computing device under consideration. On the other hand, instances of event attributes not falling within any of the plurality of clusters may indicate an out-of-bound value, which thus indicates occurrence of an anomaly.

With the presence of an anomaly ascertained, an event record to which the anomaly may correspond to, is determined. In an example, the event record may be determined based on a retrace dictionary. In an example, the retrace dictionary links each numerical identifier in the first sequence of identifiers with a corresponding event record within a set of event records. Based on the retrace dictionary, an event record may be identified as being associated with an anomaly.

On being identified with an anomaly, event record may be further processed to determine a root cause that may have resulted in the anomalous behavior of the computing device. In an example, a plurality of event records indicating occurrence of an anomaly may be correlated. The plurality of correlated event records may then be processed to determine the root cause that may have resulted in the anomalous operation of the computing device.

By way of the above-mentioned approaches, large volumes of log files and corresponding event records may be processed efficiently. Furthermore, occurrence of an anomaly may be determined based on either a deviation in a sequence of events or based on occurrence of out-of-bound values of operational or configuration parameters of a given computing device. Additionally, the present approaches not only allow for determining the occurrence of anomalies in the operation of the computing device but also help to determine the actual root cause which may have resulted in the occurrence of the anomaly.

FIG. 1 illustrates an example system 102 for determining an occurrence of an anomaly in a log file, in accordance with an example of the present subject matter. The system 102 includes a processor 104, and a machine-readable storage medium 106 which is coupled to, and accessible by, the processor 104. The system 102 may be implemented in any computing system, such as a storage array, server, desktop or a laptop computing device, a distributed computing system, or the like. Although not depicted, the system 102 may include other components, such as interfaces to communicate over the network or with external storage or computing devices, display, input/output interfaces, operating systems, applications, data, and the like, which have not been described for brevity.

The processor 104 may be implemented as a dedicated processor, a shared processor, or a plurality of individual processors, some of which may be shared. The machine-readable storage medium 106 may be communicatively connected to the processor 104. Among other capabilities, the processor 104 may fetch and execute computer-readable instructions, including instructions 108, stored in the machine-readable storage medium 106. The machine-readable storage medium 106 may include non-transitory computer-readable medium including, for example, volatile memory such as RAM, or non-volatile memory such as EPROM, flash memory, and the like. The instructions 108 may be executed to determine occurrence of an anomaly in the log file.

In an example, the processor 104 may fetch and execute instructions 108. For example, as a result of the execution of the instructions 110, a log file may be initially obtained from a computing device. The log file may include a plurality of event records. An order in which the event records are present in the log file may correspond to a sequence in which the corresponding events within the computing device may have occurred. The event records may include information relating to such different events in the form of values or indicators pertaining to different events. Such information may be represented in a structured format. For example, an event record may include a static portion (i.e., a portion which remains the same for certain types of events), and a mutable or dynamic portion (i.e., a portion comprising attributes pertaining to the corresponding event, and which may vary across events). In an example, once the event records are obtained, the event records may be parsed to obtain the static portion of the event records.

The static portion of the event records may be processed to determine a first series of logged event types, as a result of the execution of the instructions 112. The first series of logged event types thus determined includes information pertaining to the different type of events but does not include attribute value pertaining to the events. In an example, the static portion of the event records may be hashed to provide respective event IDs, which in turn may be associated with numeric identifiers to provide the first series of logged event types. Further, instructions 114 may be executed to analyze the first series of logged event types based on a sequential event model. In an example, the sequential event model is a neural network model that may be trained based on a sequence of identifiers linked to a second series of valid logged event types. The second series of valid logged event types, in one example, corresponds to computing events of performant operation of a computing system.

With the first series of logged event types analyzed, the system 102 may determine an occurrence of an anomaly. In an example, the instructions 116, when executed, may determine an occurrence of an anomaly in the log file based on the analyzing of the first series of logged event types by the sequential event model. As a result of the analysis based on the sequential event model, a deviation of the first series of logged event types from events which correspond to the performant operation of the computing device, may be determined. In an example, on determining that the log file includes information pertaining to anomalous operation of the computing device, the system 102 may further determine the root cause which may have resulted in the anomalous behavior of the computing device. In an example, the first series of logged event types are associated with an indicator depicting one of a successful operation and a failed operation of a computing device generating the log file.

The above functionalities performed as a result of the execution of the instructions 108 may be performed by different programmable entities. Such programmable entities may be implemented through neural network-based computing systems, which may be implemented either on a single computing device, or multiple computing devices. As will be explained, various examples of the present subject matter are described in the context of a computing system for training a neural network-based model, and thereafter, utilizing the neural network model for determining whether an anomaly has occurred based on the analysis of log files and their event records. These and other examples are further described with respect to other figures.

Figure 2:
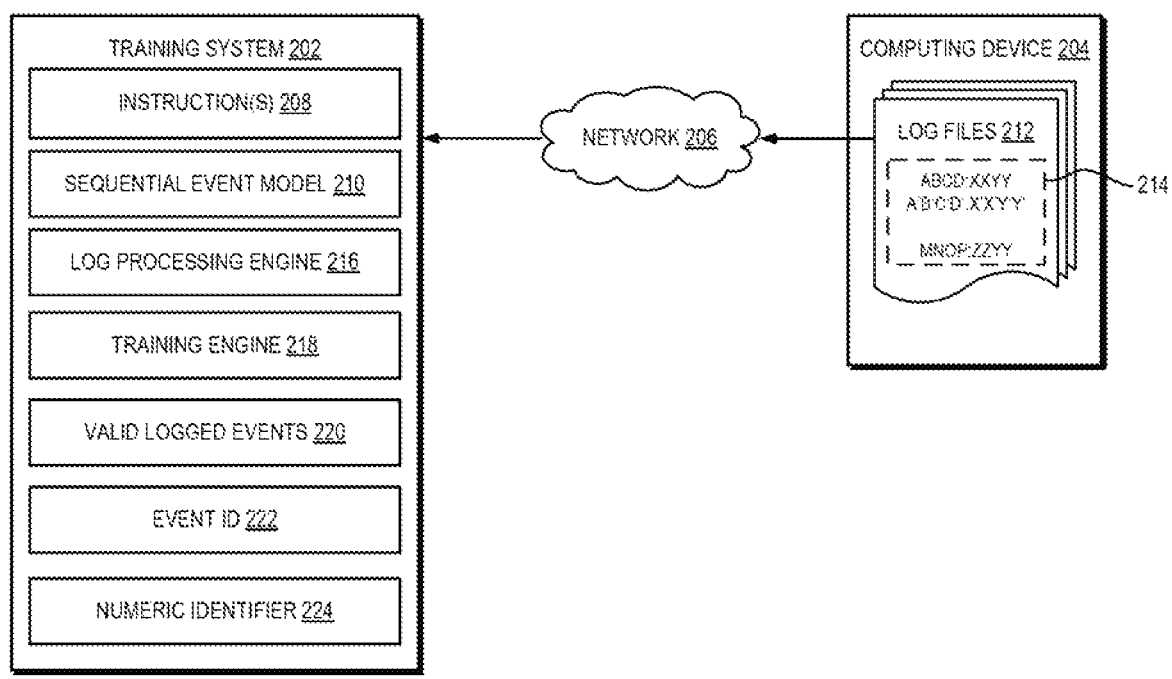
FIG. 2 illustrates a computing system for training a sequential event model, as per another example.

FIG. 2 illustrates a training system 202 comprising a processor or memory (not shown), for training a sequential event model. In an example, the sequential event model is trained based on a series of valid logged event types. The valid logged event types in turn are obtained based on log files and corresponding event records corresponding to computing events of performant operations of a computing device 204. In an example, the training system 202 (referred to as the system 202) may be in communication with the computing device 204 through a network 206. The network 206 may be a private network or a public network and may be implemented as a wired network, a wireless network, or a combination of a wired and wireless network. The network 206 may also include a collection of individual networks, interconnected with each other and functioning as a single large network, such as the Internet. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), Long Term Evolution (LTE), and Integrated Services Digital Network (ISDN).

The system 202 may further include instructions 208 for training a sequential event model 210. In an example, the instructions 208 are fetched from a memory and executed by a processor included within the system 202. The instructions 208 may be executed for training the sequential event model 210 based on log files, such as log files 212 comprising valid event records 214 obtained from the computing device 204. For the purposes of the present description, a single log file and a single valid event record are referred as log file 212 and valid event record 214, respectively.

In an example, the valid event records 214 corresponds to a series of valid events which may have occurred during a performant operation of the computing device 204. Performant operation may refer to an expected and functionally stable operating state of the computing device 204. During such performant operations, valid events corresponding to certain operations that occur in the computing device 204 may occur in a certain sequence. In case of anomalous behavior or operation of the computing device 204, certain other events may occur, or events may occur in a different sequence when compared with the sequence of valid events that may occur for the performant operation of the computing device 204. As will be explained, the sequential event model 210 is trained based on valid logged event types, which in turn corresponds to the valid event records 214. In an example, the sequential event model 210 may be stored in the memory of the system 202.

Further, the system 202 may include log processing engine 216 and a training engine 218. The log processing engine 216 and the training engine 218 (collectively referred to as engines 216, 218) may be implemented as a combination of hardware and programming, for example, programmable instructions to implement a variety of functionalities. In examples described herein, such combinations of hardware and programming may be implemented in several different ways. For example, the programming for the engines 216, 218 may be executable instructions, such as instructions 208. Such instructions may be stored on a non-transitory machine-readable storage medium which may be coupled either directly with the system 202 or indirectly (for example, through networked means). In an example, the engines 216, 218 may include a processing resource, for example, either a single processor or a combination of multiple processors, to execute such instructions. In the present examples, the non-transitory machine-readable storage medium may store instructions, such as instructions 208, that when executed by the processing resource, implement engines 216, 218. In other examples, the engines 216, 218 may be implemented as electronic circuitry.

The system 202 may further include valid logged events 220, event IDs 222, and numeric identifiers 224, with a single valid logged event, event ID and numeric identifier being referred to as valid logged events 220, event ID 222, and numeric identifier 224. In an example, the system 202 may receive log files 212 from the computing device 204. Although the log files 212 have been indicated as being obtained from the computing device 204, such log files 212 pertaining to the computing device 204 may be obtained from a stored repository without deviating from the scope of the present matter.

Once received, the log files 212 may be processed by the log processing engine 216. The valid event records 214 bear information pertaining to valid events, i.e., events that may occur during a performant operation of the computing device 204. As may be noted, the valid event records 214 within the log files 212 may be in a defined format. The defined format may be such that the valid event records 214 may have a static or a persistent portion, and a dynamic or a mutable portion. A static portion of a valid event record may correspond to a type of event. A mutable portion of the event record, on the other hand, may refer to attribute values of corresponding events. For example, the mutable portion may identify a computing resource or a network resource which may be associated with an event, say initiation of a service on the specified computing resource or a network resource.

The log processing engine 216, in one example, processes the valid event records 214 to determine the constant portion of each of the valid event records 214. The constant portion, which corresponds to the type of event, is stored as valid logged events 220. In an example, the log processing engine 216 may determine the valid logged events 220 by parsing the valid event records 214. Once the valid logged events 220 are determined, the log processing engine 216 may determine corresponding event IDs 222 based on the valid logged events 220. In an example, the log processing engine 216 may determine a hash value of the valid logged events 220 to obtain the event IDs 222. The valid event records 214 corresponding to the same event type will have the same event ID 222. Furthermore, a sequence of the valid event records 214 corresponds to a sequence of valid events that may have occurred during the performant operation of the computing device 204. In an example, the valid logged events 220 may be associated with an indicator depicting one of a successful operation and a failed operation of a computing device.

For a particular valid event record 214, the event ID 222 corresponding to the appropriate valid event record 214 (and thus the valid logged events 220) may be further associated with a numeric identifier 224. In this manner, the log processing engine 216 may associate a plurality of numeric identifiers, such as numeric identifiers 224, with corresponding event IDs 222. In the context of the present example, different event IDs corresponding to the different valid logged events 220 may be represented as a combination of numeric or alphanumeric characters. Further associating the event IDs 222 with the numeric identifiers 224 may result in reduction of complexity when training the sequential event model 210, as will be discussed further in the present description.

With the numeric identifiers 224 obtained, the training engine 218 of the system 202 may further train the sequential event model 210 based on the numeric identifiers 224 (which correspond to the respective valid logged events 220). As described previously, the sequence of the valid event records 214 correspond to the sequence of valid events that may have occurred during the performant operation of the computing device 204. Since the numeric identifiers 224 also correspond to the valid event records 214, the sequence of the numeric identifiers 224 would also correspond to the sequence of the valid events. As a result, the sequential event model 210 being trained on the valid logged event (i.e., the numeric identifiers 224), is effectively trained based on the sequence of valid events.

In one example, the training of the sequential event model 210 may involve determining a probability table for different event IDs 222 and hence, for the numeric identifiers 224. The probability table in the present example may indicate a probability of occurrence of a successive event following a given current event. This aspect is further explained in conjunction with a following example, in which two example sequences of numeric identifiers 224 are utilized for training the sequential event model 210.

Example Sequence A: 23 15 35 56 87 90 78
Example Sequence B: 12 66 15 35 87 90 20

The above example sequences A and B provide a sequence of numeric identifiers 224, with both the example sequences A and B corresponding to a sequence of valid events occurring during the performant operation of a computing device, such as the computing device 204. For training, the training engine 218 may train the sequential event model 210 based at least on the example sequences A and B, as per an example. Based on the example sequences, the sequential event model 210 may be associated with a probability values for each of the numeric identifiers 224 (which correspond to a certain valid event). In the present example, a valid event (say event X) corresponding to the numeric identifier '35' occurs after the valid event (say event Y) corresponding to the numeric identifier '15' in both sequences A and B. Hence, the sequential event model 210 may determine the probability of occurrence of the event X after the event Y as 100%, since in both example sequences A and B, event X is occurring after the event Y. In another example, the probability of occurrence of an event M (corresponding to the valid event with numeric identifier '87') after event N (corresponding to the valid event with numeric identifier '56'), may be 50% since event M is to occur after event N only in sequence A. In such a manner, probability values of other events in the example sequences A and B may be defined within a probability table for the sequential event model 210.

In an example, the sequential event model 210 may be a recurrent neural network model. A recurrent neural network may be a neural network which involves providing an output from a previous cycle as input to a current cycle. An example of a recurrent neural network includes, but is not limited to, Long Short-Term Memory (LSTM) based neural networks. The above-mentioned examples of sequential event model 210 are only indicative and should not be considered as limiting. For example, neural network model which accounts for historical information may be utilized without deviating from the scope of the present subject matter.

Once the sequential event model 210 is trained, it may be utilized for analyzing log files to determine whether an anomalous event has occurred. For example, an occurrence of events in a target computing device may be assessed based on the sequential event model 210 and the underlying probability table. In such a case, based on the occurrence of the event, anomalies which may occur during the operation of given computing device, may be determined. The manner in which such anomalies may be detected is further described in conjunction with FIG. 3.

Figure 3:
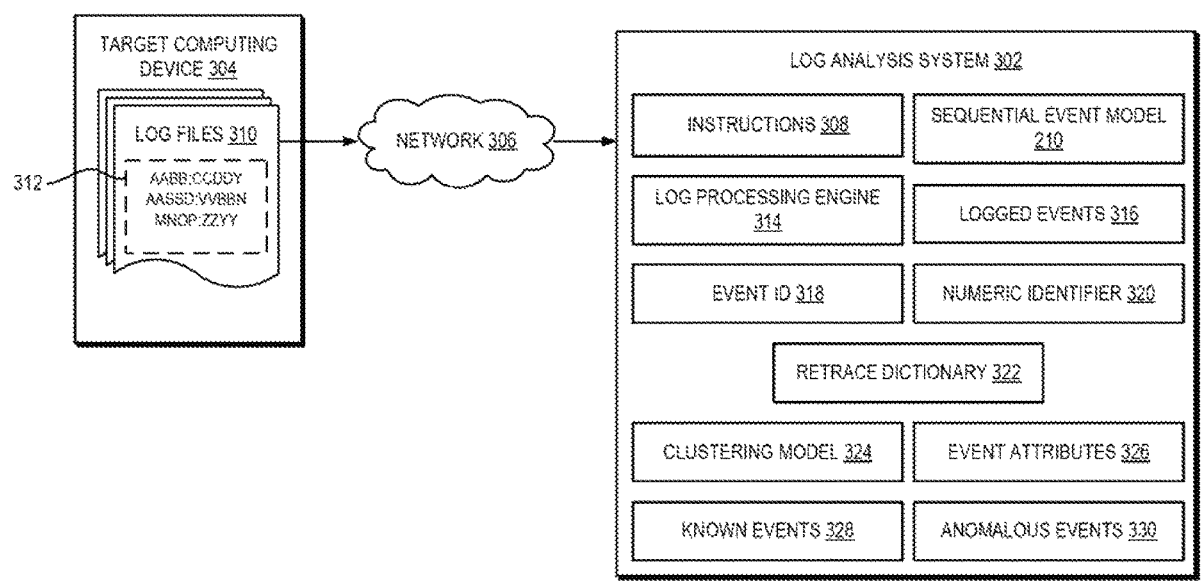
FIG. 3 illustrates a computing system for analyzing event records in a log file, as per an example.

FIG. 3 illustrates a log analysis system 302. The log analysis system 302 (referred to as the system 302) is to analyze log files to determine occurrence of anomalous behavior during the operation of a target computing device 304. In an example, the system 302 may be communicatively coupled to the target computing device 304 through a network 306. The network 306 may be a private network or a public network and may be implemented as a wired network, a wireless network, or a combination of a wired and wireless network, and may be similar to the network 206 (as depicted in FIG. 2). Although the present example depicts the system 302 to be coupled to the target computing device 304, the system 302 may be coupled to other computing devices, without deviating from the scope of the present subject matter.

Similar to the system 102, the system 302 may further include instructions 308, which when executed, analyze log files 310 of the target computing device 304 based on a sequential event model, such as the sequential event model 210. In an example, the instructions 308 are fetched from a memory and executed by a processor included within the system 302. In another example, the sequential event model 210 may be stored in a memory of the system 302. The log files 310 may be generated by certain software or hardware components of the target computing device 304. The log files 310 record events pertaining to various operations, execution of services or programs, or messaging between different components of the target computing device 304. The information pertaining to different events may be recorded as event records 312. A sequence in which information pertaining to the different events is recorded in the event records 312 may correspond to a sequence in which such corresponding events may have occurred.

Continuing further with the present example, the system 302 may include log processing engine 314, which in an example, may be implemented by instructions 308. The functioning of the log processing engine 314 may generate data, such as logged events 316, event ID 318, and numeric identifiers 320. The system 302 may further include a retrace dictionary 322 and a clustering model 324. The clustering model 324 may operate based on data, such as event attributes 326, and may generate information pertaining to known events 328 and anomalous events 330. Although not depicted, the system 302 may include other engines and data which may supplement its functioning. Such example engines and data would also be within the scope of the present subject matter. In an example, the engines such as the log processing engine 314 may be implemented in the same manner as the log processing engine 216 (depicted in FIG. 2).

In operation, the log files 310 generated by the target computing device 304 are obtained by the system 302. As described previously, the log files 310 record information pertaining to different events that may have occurred as a result of the operation of the target computing device 304. Similar to the log files 212, the log files 310 may also have a defined format. The defined format may be such that the event records 312 may have a constant or a persistent portion, and a mutable portion. The constant portion of the event record 312 may correspond to a type of event, whereas the mutable portion may include attribute values associated with the event. This aspect is explained in conjunction with the following example event record:

23 Sep. 2017 10:13:03 Service sr_56503 started on Node node_3

The above example event record indicates the initiation of the aforementioned service sr_56503 on a node which is referenced as node_3. In the above example event record, the text in bold indicates the mutable part of the example event record, whereas the remaining portion indicates the static or the persistent portion of the example event record. In operation, the log processing engine 314 may process the example event record to determine the constant portion and the mutable portion. The constant portion thus retrieved is stored in the following manner:

Service <*>started on Node <*>, which indicates a type of event, namely, initiation of a service at the aforementioned node. Similarly, the name of the service, i.e., sr_56503 along with the identity of the node, i.e., node_3, constitute the event attributes for the aforementioned event type. In an example, the log processing engine 314 may determine the logged events 316 by parsing the event records 312. In a similar manner, other event records 312 may be further processed to obtain the constant portion (which is indicative of an event type) and the corresponding event attributes. In an example, the constant portion indicating the event type, and its corresponding event attribute may thereafter be stored as logged events 316 and event attributes 326, respectively.

Once the logged events 316 are determined, the log processing engine 314 may determine event IDs 318 for the corresponding logged events 316. In an example, the event IDs 318 may be determined by calculating a hash value of the logged events 316. As may be noted, the logged events 316 corresponding the same event types will have the same event IDs 318. Furthermore, the sequence of the logged events 316 also corresponds to the sequence of the events that may have occurred during the operation of the computing device 304.

The event IDs 318 (and thus the logged events 316) may be further associated with respective numeric identifiers 320. This process may be performed for multiple event records 312 within the log files 310 under consideration. In an example, the numeric identifiers 320 which are associated with the event IDs 318 are real integers. In another example, the numeric identifiers 320 which are associated with the event IDs 318 may be based on a mapping table. Such an example mapping table may map event IDs 318 (which in turn are associated with certain types of events) with real numbers. The log processing engine 314, in such examples, may associate the numeric identifiers 320 based on such a mapping table.

Continuing with the present example, the log processing engine 314 may analyze the numeric identifiers 320 to determine whether the event records 312 indicate occurrence of an anomalous behavior during the operation of the target computing device 304. In an example, the log processing engine 314 may analyze a sequence of the numeric identifiers 320 based on the sequential event model 210. As described previously, the sequential event model 210 was trained based on a sequence of events corresponding to performant operation of a computing device. While analyzing, the log processing engine 314 is to determine whether the sequence of events represented by the sequence of numeric identifiers 320 deviates from a sequential event model, such as the sequential event model 210. If the sequence of numeric identifiers 320 conform to the sequential event model 210, the log processing engine 314 may conclude that the operation of target computing device 304 does not include an anomaly. On the other hand, if the sequence of the numeric identifiers 320 is determined to be deviating from the sequential event model 210, the log processing engine 314 may conclude that the operation of the target computing device 304 is anomalous.

In an example, the log processing engine 314 may analyze the numeric identifiers 320 based on a probability table defined within the sequential event model 210. As described previously, the probability table may indicate a probability of occurrence of a successive event following a given current event. If the sequence of events as indicted by the sequence of numeric identifiers 320 (as indicated in example sequence C) matches one of the probability values defined within the probability table of the sequential event model 210, the log processing engine 314 may accordingly determine that no anomalies have occurred during the operation of the target computing device 304. If, however, a sequence of numeric identifiers 320 does not conform to a probability value within the probability table, the log processing engine 314 may conclude that an anomalous event may have occurred during the operation of the target computing device 304.

The above-mentioned aspects are further defined in conjunction with the following example sequence C. The example sequence C is only an example and is not intended to be construed as limiting the scope of the claimed subject matter:

Example Sequence C: 24 14 36 54 87 90 78

The above example sequence C includes a series of events corresponding to the logged events 316, with each of such logged events 316 being denoted by a real-numbered numeric identifier 320. As described previously, the sequential event model 210 was trained based on example sequences A and B. Based on the training, a performant operation of a computing device would involve an event corresponding to the numeric identifier '35' to occur after an event corresponding to the numeric identifier '15'. In the present example, however, the event corresponding to the numeric identifier '36' (instead of event '35') occurs after the event corresponding to the numeric identifier '15'. Considering that the probability of the event '35' occurring after event '15' is 100%, occurrence of an event '36' after the event '15' would be attributable to an anomaly which may have occurred in the target computing device 304. In a similar manner, a plurality of sequence of events in the form of a sequence of numeric identifiers 320 may be analyzed based on the sequential event model 210 to ascertain occurrence of an anomaly.

As may be understood, an anomaly may not only result in the form of out of turn events that may occur during an otherwise performant operation of the computing device. In certain instances, the anomalies may result in skewed event attribute values for certain event types which may occur during the operation of a computing device under consideration. For example, even though a first predetermined event is followed by a second predetermined event, an anomaly may result in the values of one of the events to be out-of-bounds, when compared to a performant operation of the computing device. As a result, determining presence of such out-of-bound values, may be utilized for assessing occurrence of an anomaly.

To this end, the event attribute values corresponding to the event records 312 are obtained and are stored as event attributes 326. In an example, the event attributes 326 are obtained by the log processing engine 314 based on the mutable portion of the event records 312 of the log files 310. Once obtained, the clustering model 324 may group values of event attributes 326 into a set of clusters.

In an example, the clustering model 324 may be trained to form clusters based on attribute values pertaining valid events. The plurality of attribute values (referred to as valid attribute values) may pertain to events that may occur during the performant operation of the computing device. In an example, clustering model 324 is based on a k-nearest neighbors (KNN) based model.

In operation, the clustering model 324 may process the event attributes 326, to cluster them into one of a plurality of clusters based on their value. In such instances, similar values of event attributes 326 may be clustered together and may correspond to known events. In an example, such similar values of the event attributes 326 may be clustered as known events 328. Values which are dissimilar or are substantially deviating from the other values, may correspond to anomalous events. In an example, such event attributes 326 may be categorized as anomalous events 330. In the present context, the clustering of the event attributes 326 into known events 328 and anomalous events 330 are only indicative. The clustering model 324, thus described, may cluster the event attributes 326 into additional number of clusters without deviating from the scope of the present subject matter.

As may be noted, the above-mentioned examples may be utilized to ascertain the occurrence of anomalies based on the analysis of event records 312 based on one of the sequential event model 210 and the clustering model 324. Although the present approaches may be utilized for determining occurrence of anomalous behavior, such approaches may not be sufficient for determining the corresponding event record from amongst the event records 312. As described above, the sequential event model 210 may determine occurrence of an anomaly based on the sequence of numeric identifiers 320. Such numeric identifiers 320 are determined based on the event type, i.e., logged events 316 which in turn are abstracted from the event records 312 of the log files 310.

In an example, the system 302 may further include the retrace dictionary 322. The retrace dictionary 322, in an example, links each of the numeric identifiers 320 and the corresponding event ID 318, with a corresponding event record from amongst the event records 312. Based on the retrace dictionary, one of the event records 312 may be identified as corresponding with an anomaly. For example, the sequential event model 210 may identify a numeric identifier from the sequence of numeric identifiers 320, as corresponding to an anomalous event. The log processing engine 314 may thereafter determine an event record from amongst the event records 312, based on the retrace dictionary 322. In an example, the retrace dictionary 322 may be populated at a time when the log files 310 are analyzed by the log processing engine 314 to provide the logged events 316 and the event attributes 326.

Once the relevant event records 312, which have been found to correspond to anomalous operation of the target computing device 304, have been identified, the same may be processed to determine a probable root cause owing to which the anomalous operation of the target computing device 304 may have occurred. As may be noted, information pertaining to multiple causes may have been captured and recorded in the event records 312 of the log files 310. In an example, the clustering model 324 may be utilized for determining a correlation between the identified event records 312. In operation, the event records 312 identified as pertaining to anomalous events may be provided to the clustering model 324. The clustering model 324 may parse the identified event records 312 to determine keywords which may be appearing in such event records 312. The keywords thus determined may then be clustered into a plurality of clusters based on a number of criteria. Examples of such criteria include, but are not limited to, term of frequency of keyword, and their similarity. As may be understood, similar keywords will be clustered together. Depending on number of data points which may be present within a certain cluster, the probable root cause may be determined. As may be further noted, the present approaches allow such event records pertaining to anomalous behavior to be identified from an otherwise large set of event records 312 in an efficient and quick manner.

Figure 4:
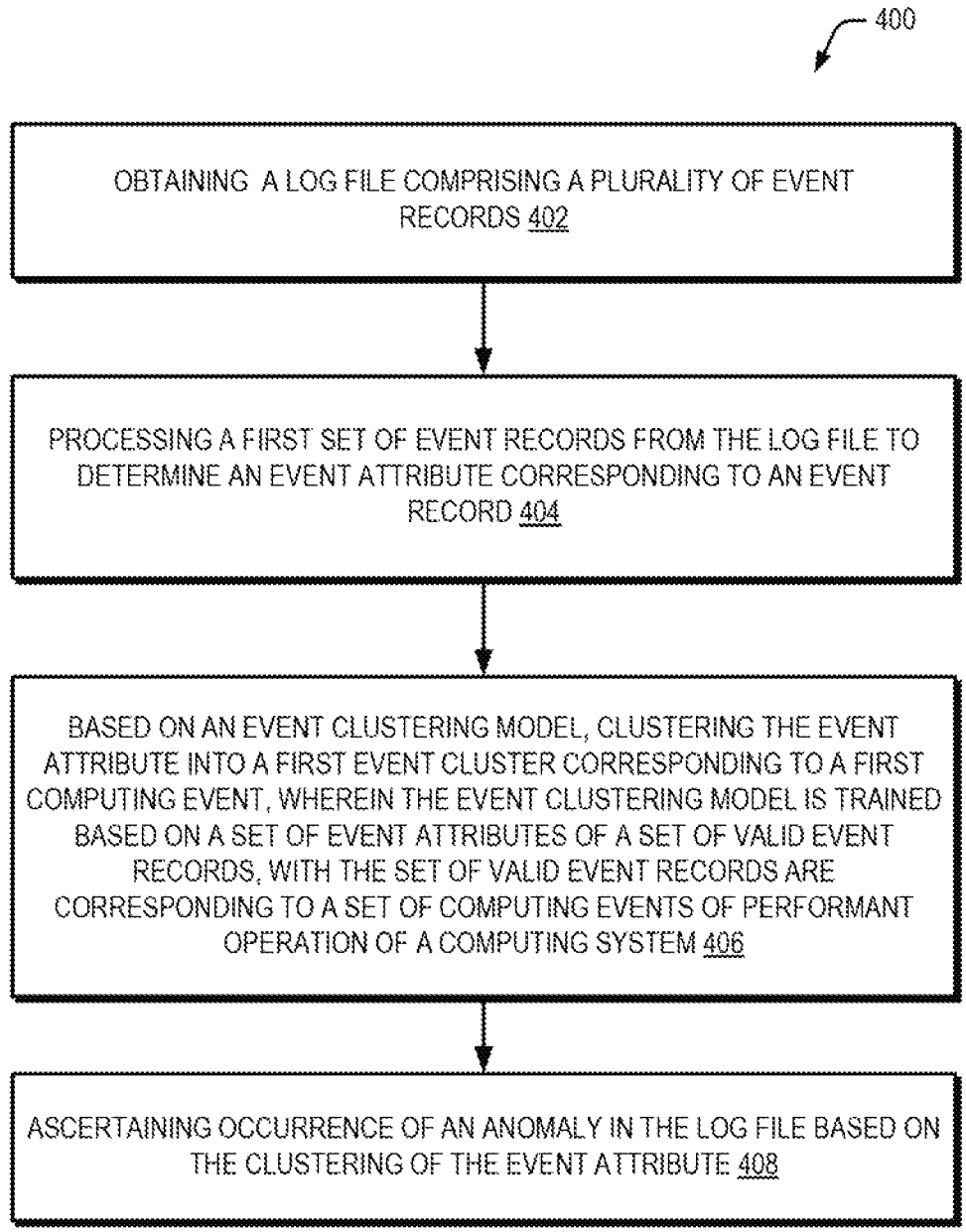
FIG. 4 illustrates a method for analyzing event records based on event attributes, as per an example.
Figure 5:
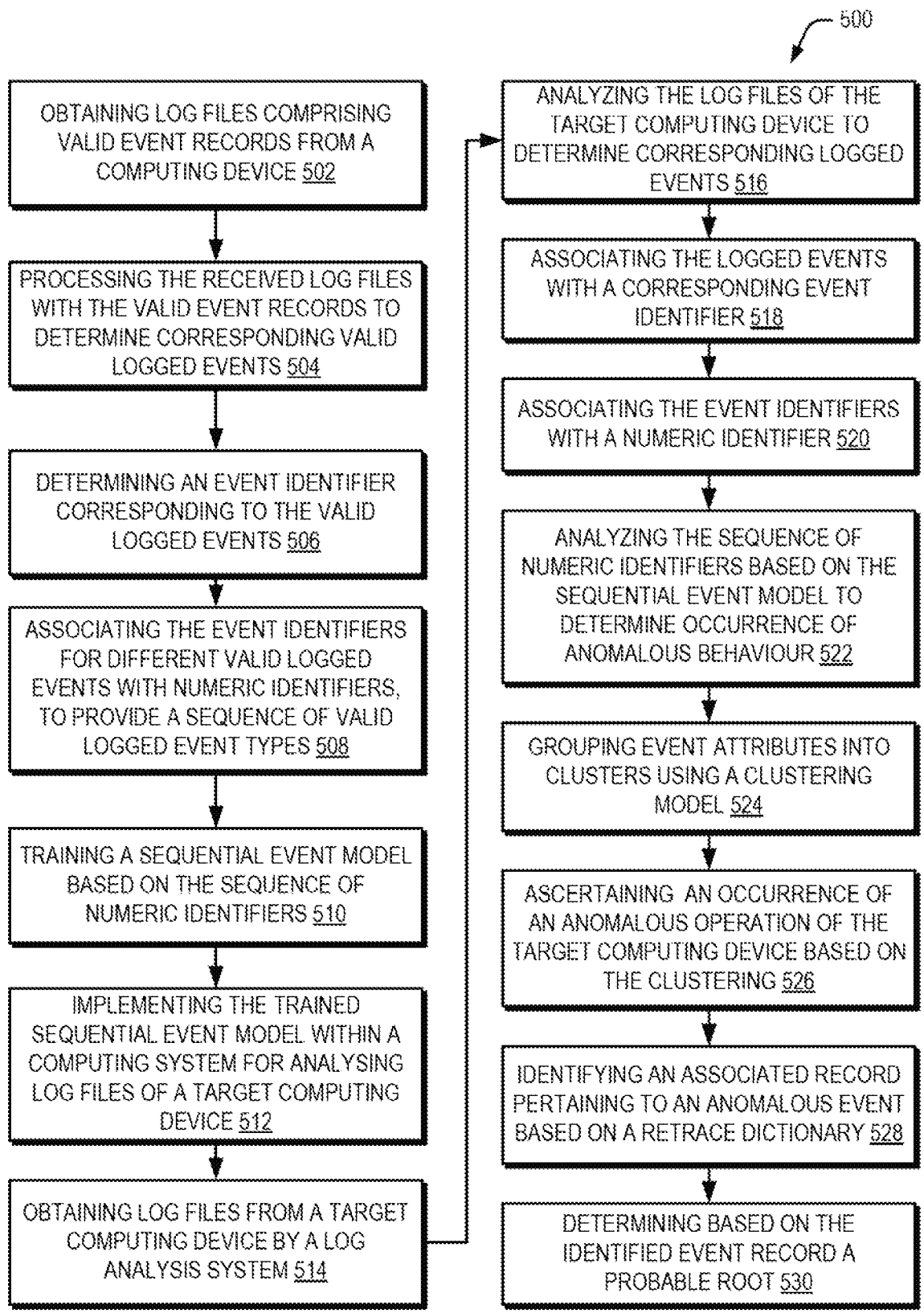
FIG. 5 illustrates a method for training a sequential event model and analyzing event records of a log file, based on a sequential event model, as per an example.

FIGS. 4-5 illustrate example methods 400-500 for analyzing log files to determine occurrence of an anomalous behavior during the operation of a target computing device, in accordance with examples of the present subject matter. The order in which the above-mentioned methods are described is not intended to be construed as a limitation, and some of the described method blocks may be combined in a different order to implement the methods, or alternative methods.

Furthermore, the above-mentioned methods may be implemented in a suitable hardware, computer-readable instructions, or combination thereof. The steps of such methods may be performed by either a system under the instruction of machine executable instructions stored on a non-transitory computer readable medium or by dedicated hardware circuits, microcontrollers, or logic circuits. For example, the methods may be performed by system 302. In an implementation, the methods may be performed under an "as a service" delivery model, where the system 302, operated by a provider, receives programmable code. Herein, some examples are also intended to cover non-transitory computer readable medium, for example, digital data storage media, which are computer readable and encode computer-executable instructions, where said instructions perform some or all the steps of the above-mentioned methods.

In an example, the method 400 may be implemented by system 302 for analyzing log files of a computing device, such as the target computing device 304. At block 402, a log file comprising a plurality of event records is obtained. In an example, a log analysis system 302 may obtain log files 310 from a target computing device 304. The system 302 may obtain the log files 310 in response to execution of instructions 308. The log files 310 may be generated by certain software or hardware components of the target computing device 304. As described previously, the log files 310 includes information of events pertaining to various operations, execution of services or programs, or messaging between different components of the target computing device 304, as event records 312.

At block 404, a first set of event records from the log file may be processed to determine an event attribute corresponding to an event record. For example, the log processing engine 314 may parse the event records 312 to determine event attributes 326 corresponding to events corresponding to the event records 312. In an example, one of the event records 312 may include constant portion (which is indicative of an event type) and a mutable portion (which corresponds to event attributes corresponding to the event).

At block 406, the event attribute may be clustered into a first event cluster corresponding to a first computing event. In an example, the clustering is implemented through an event clustering model which is trained based on a set of event attributes which are associated with a set of valid event records. Such valid event records, in turn, correspond to a set of computing events of performant operation of a computing system. In an example, clustering model 324 is based on a k-nearest neighbours (k-NN) based model. In operation, the clustering model 324 may process the event attributes 326, to cluster them into one of a plurality of clusters based on their value.

At block 408, an occurrence of an anomaly in the log file may be based on the clustering of the event attribute. For example, the clustering model 324 may result in clustering of similar values of event attributes 326 into a single cluster which in turn may correspond to known events, and hence, may be clustered as known events 328. Similarly, based on the clustering model 324 values which are dissimilar or are substantially deviating from the other values, may correspond to and be indicative of anomalous events, and hence, may be categorized as anomalous events 330. The clustering model 324 thus described, may cluster the event attributes 326 into a number of clusters without deviating from the scope of the present subject matter.

FIG. 5 illustrates another example method 500 for training a sequential event model based on which log files of a target computing device may be analysed, and accordingly occurrence of an anomaly may be ascertained. Based on the present approaches as described in the context of the example method 500, event records which may correspond to anomalous operation of the target computing device may be determined along with a probable root cause which may have caused the occurrence of such an anomalous operation. The present example method illustrates training of a sequential event model and analysing event records of log files, based on such a trained sequential event model. It is pertinent to note that such training and eventual analysis of log files may not occur in continuity and may be implemented separately without deviating from the scope of the present subject matter.

At block 502, log files comprising valid event records are obtained from the computing device 204. For example, the training system 202 (referred to as the system 202) may obtain log files 212 comprising valid event records 214 from a computing device 204. In an example, the valid event records 214 correspond to a certain sequence of valid events which occur during a performant operation of the computing device 204. Performant operation may refer to an expected and functionally stable operating state of the computing device 204.

At block 504, the received log files with the valid event records may be processed to determine the corresponding valid logged events. For example, the log processing engine 216 may process the log files 212, which may be in defined format which includes constant or a persistent portion, and a mutable portion. The constant portion of an event records 214 may correspond to the type of event. The mutable portion on the other hand, may refer to attribute values of said events. The constant portion, which corresponds to the type of event, is stored as valid logged events 220. In an example, the log processing engine 216 may determine the valid logged events 220 by parsing the valid event records 214.

At block 506, an event identifier corresponding to the valid logged events is determined. For example, the log processing engine 216 may determine an event ID 222 based on the valid logged events 220. In an example, the log processing engine 216 may obtain a hash value of the valid logged events 220 which is allocated as the event ID 222. In such instances, the valid event records 214 corresponding with the same event types will have the same event ID 222. Furthermore, the sequence of the valid event records 214 corresponds to the sequence of valid events that may have occurred during the performant operation of the computing device 204.

At block 508, the event identifiers for different valid logged events are further associated with numeric identifier, to provide a sequence of valid logged event types. For example, the log processing engine 314 may associate the event ID 222 corresponding to the appropriate valid event records 214 with a numeric identifier 224. Such a process may be repeated for other event identifiers resulting a sequence of numeric identifiers 224. The sequence in which the sequence of the numeric identifiers 224 appear may correspond to the sequence in which valid events during the performant operation of computing device (e.g., a computing device 204) occurred.

At block 510, a sequential event model is trained based on the sequence of numeric identifiers. For example, the training engine 218 may train the sequential event model 210 based on the numeric identifiers 224 associated with the event IDs 222 (which in turn correspond to the valid logged events 220). Since the sequence of numeric identifiers 224 correspond to the sequence of valid events indicated in the valid event records 214, the sequential event model 210 is thus being trained to identify occurrence of valid (or anomalous) events based on the sequence in which such events may occur. In an example, the sequential event model 210 may be a recurrent neural network model. An example of a recurrent neural network includes, but is not limited to, Long Short-Term Memory (LSTM) based neural networks.

At block 512, the trained sequential event model is implemented within a computing system for analysing log files of a target computing device. For example, once the sequential event model 210 is trained, it may be utilized for analysing log files 310 from the target computing device 304 to determine whether an anomalous event has occurred. Although block 512 is depicted as following block 510, the sequential event model 210 may be implemented separately without deviating from the scope of the present subject matter.

At block 514, log files from a target computing device are obtained by a log analysis system. For example, based on the execution of instructions 308, the system 302 may obtain log files 310 from the target computing device 304. In an example, the system 302 may be communicatively coupled to the target computing device 304 through a network 306. The log files 310 may further include event records 312 which may include information as event records 312. The event records 312 may include information pertaining computing events, such as various operations, execution of services or programs, or messaging between different components of the target computing device 304.

At block 516, the log files of the target computing device are analysed to determine corresponding logged events. For example, the log files 310 may be in defined format which in turn may include a constant portion and a mutable portion. The constant portion of the event records 312 may correspond to the type of event, whereas the mutable portion on the other hand, may refer to attribute values of said events. In an example, the type of event is stored as logged events 316, whereas the attributes values of corresponding event may be stored as event attributes 326.

At block 518, the logged events may be associated with a corresponding event identifier. For example, the log processing engine 314 may determine event IDs 318 for the corresponding logged events 316. In an example, the event ID 318 may be determined by calculating a hash value of the logged events 316. As may be noted, the logged events 316 corresponding the same event types will have the same event ID 318.

At block 520, the event identifiers may be associated with a numeric identifier. For example, corresponding event IDs 318 (and thus the logged events 316) may be further associated with respective numeric identifiers 320. In an example, the numeric identifiers 320 which are associated with the event ID 318 are real integers. In the context of the present example, the sequence in which the numeric identifiers 320 are arranged correspond to the sequence of events as indicated in the event records 312.

At block 522, the sequence of numeric identifiers may be analysed based on the sequential event model in order to determine occurrence of anomalous behavior during the operation of the target computing device. For example, the log processing engine 314 may analyse the numeric identifiers 320 based on the sequential event model 210. If the sequence of numeric identifiers 320 conform to the sequential event model 210, the log processing engine 314 may conclude that the operation of target computing device 304 does not include an anomaly. On the other hand, if the sequence of the numeric identifiers 320 is determined to be deviating from the sequential event model 210, the log processing engine 314 may conclude that the operation of the target computing device 304 is anomalous. In an example, the log processing engine 314 may analyse the numeric identifiers 320 based on a probability table defined within the sequential event model 210.

At block 524, event attributes may be grouped into clusters using a clustering model. For example, the log processing engine 314 may analyse the event attributes 326 based on the clustering model 324. In an example, the clustering model 324 may group values of event attributes 326 into a set of clusters. In operation, the clustering model 324 may process the event attributes 326, to cluster them into one of a plurality of clusters based on their value. In such instances, similar values of event attributes 326 may be clustered together and may correspond to known events. The clustering model 324 may be trained to form clusters based on attribute values pertaining valid events, i.e., events which correspond to a performant operation of the target computing device 304.

At block 526, based on the clustering an occurrence of an anomalous operation of the target computing device may be ascertained. For example, similar values of event attributes 326 may be clustered together and may correspond to known events. In an example, such similar values of the event attributes 326 may be clustered as known events 328. Values which are dissimilar or are substantially deviating from the other values, may correspond to anomalous events. In an example, such event attributes 326 may be categorized as anomalous events 330. As may be noted, the above-mentioned examples may be utilized to ascertain the occurrence of anomalies based on the analysis of event records 312 based on one of the sequential event model 210 and the clustering model 324.

At block 528, an associated record pertaining to an anomalous event may be identified based on a retrace dictionary. For example, the log processing engine 314 may determine the pertinent record from amongst the event records 312 based on the retrace dictionary 322. The retrace dictionary 322, in an example, links each of the numerical identifiers in the numeric identifiers 320 and the corresponding event ID 318, with a corresponding event record from amongst the event records 312. Based on the retrace dictionary 322, an event record from amongst the event records 312 may be identified as associated with an anomaly.

At lock 530, based on the identified event record corresponding to an anomalous event, a probable root cause may be determined. For example, the identified event records may be analysed based on the clustering model 324. The clustering model 324 may parse the identified event records 312 to determine keywords which may be appearing in such event records 312. The keywords thus determined may then be clustered into a plurality of clusters based on a number of criteria. Examples of such criteria include, but are not limited to, term of frequency of keyword, and their similarity. Depending on number of data points which may be present within a certain cluster, the probable root cause may be determined.

Figure 6:
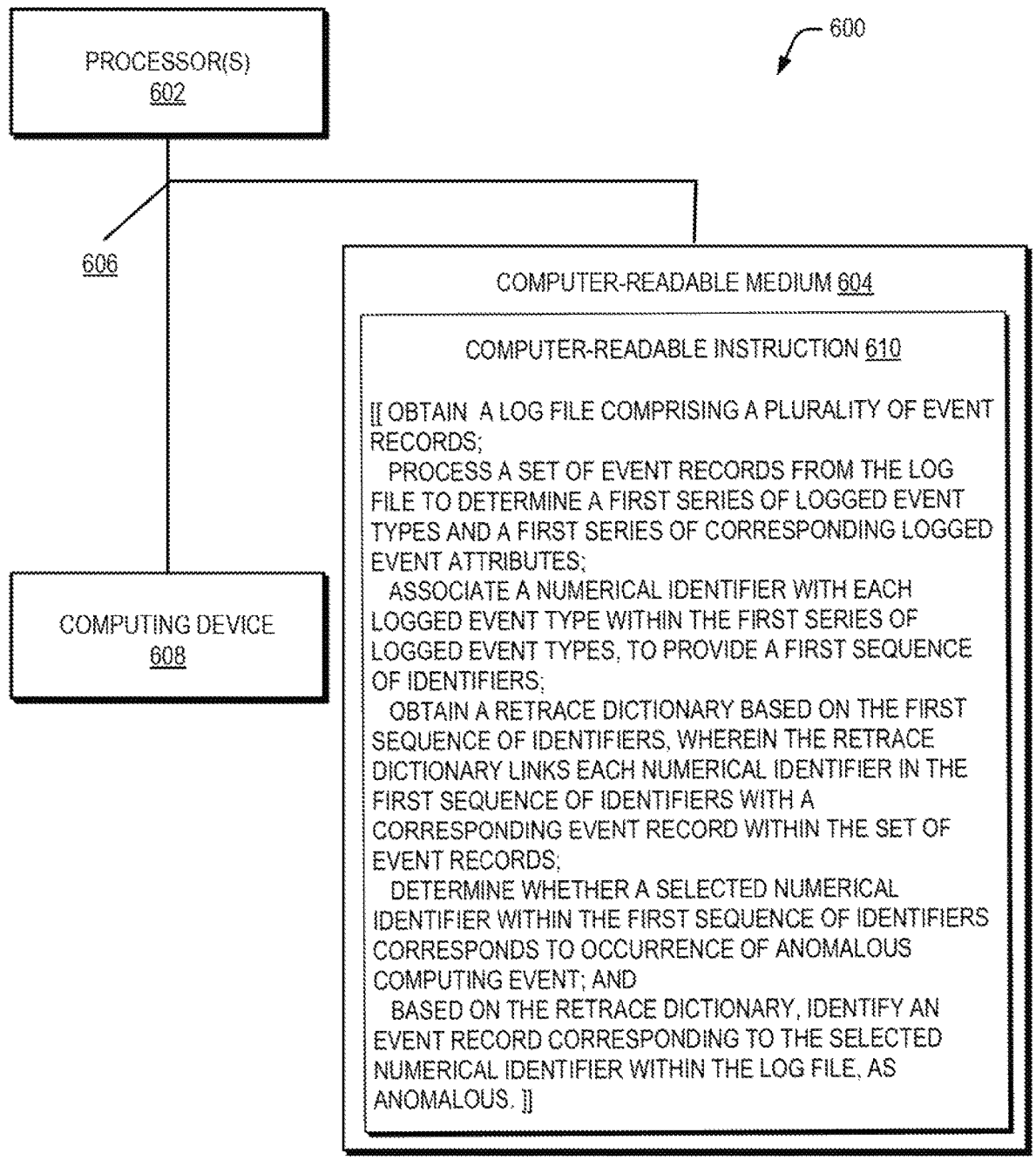
FIG. 6 illustrates a system environment implementing a non-transitory computer readable medium for analyzing event records in a log file, as per an example.

FIG. 6 illustrates a computing environment 600 implementing a non-transitory computer readable medium for analyzing log files to determine occurrence of an anomalous behaviour during the operation of a target computing device, such as the target computing device 304. In an example, the computing environment 600 includes processor(s) 602 communicatively coupled to a non-transitory computer readable medium 604 through a communication link 606. In an example implementation, the computing environment 600 may be for example, the system 202. In an example, the processor(s) 602 may have one or more processing resources for fetching and executing computer-readable instructions from the non-transitory computer readable medium 604. The processor(s) 602 and the non-transitory computer readable medium 604 may be implemented, for example, in system 302 (as has been described in conjunction with the preceding figures).

The non-transitory computer readable medium 604 may be, for example, an internal memory device or an external memory device. In an example implementation, the communication link 606 may be a network communication link. The processor(s) 602 and the non-transitory computer readable medium 604 may also be communicatively coupled to a computing device 608 over the network.

In an example implementation, the non-transitory computer readable medium 604 includes a set of computer readable instructions 610 which may be accessed by the processor(s) 602 through the communication link 606. Referring to FIG. 6, in an example, the non-transitory computer readable medium 604 includes instructions 610 that cause the processor(s) 602 to obtain a log file, such as one of the log files 310, comprising a plurality of event records, such as event records 312. Once the log files 310 have been obtained, the instructions 610 may cause the processor(s) 602 to process a set of event records from the log file to determine a first series of logged event types and a first series of corresponding logged event attributes. For example, the instructions 610 may cause the processor(s) 602 to process the event records 312 to identify logged events 316 and corresponding event attributes 326. The instructions 610 may be further executed to cause the processor(s) 602 to determine a hash value of the logged events 316. The hash value of the logged events 316 may be stored as e. The instructions 610 thereafter may be executed to cause the processor(s) 602 to associate numerical identifiers 320 with each logged event type, i.e., the event IDs 318.

Thereafter, a retrace dictionary, such as the retrace dictionary 322, may be generated based on the logged events 316. In an example, the retrace dictionary 322, in an example, links each of the numerical identifiers in the numeric identifiers 320 and the corresponding event ID 318, with a corresponding event record from amongst the event records 312. With the retrace dictionary 322 thus obtained, the instructions 610 may be further executed to cause the processor(s) 602 may cause to determine whether one of the numeric identifiers 320 correspond to occurrence of an anomalous event. In an example, one of the numeric identifiers 320 may be analyzed based on the sequential event model 210 to determine whether it corresponds to an anomalous event or not. If the numeric identifiers 320 corresponds to an anomalous event, the instructions 610 may cause the processor(s) 602 to identify the corresponding event record from amongst the event records 312, based on the retrace dictionary 322. In an example, the identified event records may be correlated, in an example, based on a clustering model 324 to determine a probable root cause which may have caused the anomalous operation of the target computing device 304.

Although examples for the present disclosure have been described in language specific to structural features and/or methods, it is to be understood that the appended claims are not necessarily limited to the specific features or methods described. Rather, the specific features and methods are disclosed and explained as examples of the present disclosure.

We claim:

1. A system comprising:
    a processor;
    a machine-readable storage medium comprising instructions executable by the processor to:
        obtain a log file comprising a plurality of event records;
        process a set of event records from the log file to determine a first series of logged event types and a first series of corresponding logged event attributes;
        associate a numerical identifier with each logged event type within the first series of logged event types, to provide a first sequence of identifiers;
        obtain a retrace dictionary based on the first sequence of identifiers, wherein the retrace dictionary links each numerical identifier in the first sequence of identifiers with a corresponding event record within the set of event records;
        determine whether a selected numerical identifier within the first sequence of identifiers corresponds to occurrence of anomalous computing event; and
        based on the retrace dictionary, identify an event record corresponding to the selected numerical identifier within the log file, as anomalous.

2. The system as claimed in claim 1, wherein, to process the set of event records, the instructions, when executed, are to:
    select an event record from the set of event records;
    parse the event record to determine a static portion and a mutable portion of the event record, wherein
        the static portion corresponds to a type of event corresponding to the selected event record; and
        the mutable portion corresponds to event attributes corresponding to the selected event record.

3. The system as claimed in claim 2, wherein, for each event record within the plurality of event records, the instructions executable by the processor are to further:
    evaluate a hash value corresponding to the static portion; and
    associate a numerical identifier to the hash value to provide the first series of logged event types.

4. The system as claimed in claim 1, wherein the first series of logged event types indicate a series of computing events in response to operation of a computing device generating the log file.

5. The system as claimed in claim 1, wherein the first series of logged event types are associated with an indicator depicting one of a successful operation and a failed operation of a computing device generating the log file.

6. The system as claimed in claim 1, wherein the first sequence of identifiers linked to a second series of valid logged event types are numeric.

7. The system as claimed in claim 1, wherein the instructions executable by the processor are to further analyze the first series of logged event types based on a sequential event model, wherein the sequential event model is a recurrent neural network-based model.

8. The system as claimed in claim 7, wherein the sequential event model comprises a probability table bearing a probability value of occurrence of a successive event following a given current event.

9. The system as claim in claim 8, wherein the instructions executable by the processor are to further analyze the first series of logged event types based on the probability table to determine the occurrence of an anomaly.

10. A method comprising:
    obtaining a log file comprising a plurality of event records;
    processing a set of event records from the log file to determine a first series of logged event types and a first series of corresponding logged event attributes;
    associating a numerical identifier with each logged event type within the first series of logged event types, to provide a first sequence of identifiers;
    obtaining a retrace dictionary based on the first sequence of identifiers, wherein the retrace dictionary links each numerical identifier in the first sequence of identifiers with a corresponding event record within the set of event records;
    determining whether a selected numerical identifier within the first sequence of identifiers corresponds to occurrence of anomalous computing event; and
    based on the retrace dictionary, identifying an event record corresponding to the selected numerical identifier within the log file, as anomalous.

11. The method as claimed in claim 10, wherein the processing of the set of event records comprises;

parsing an event record to determine a static portion and a mutable portion of the event record for each event record within the set of event records, wherein, the static portion corresponds to a type of event corresponding to the parsed event record; and the mutable portion corresponds to event attributes corresponding to the selected event record.

12. The method as claimed in claim 10, wherein determining whether the selected numerical identifier corresponds to occurrence of anomalous computing event, comprises:

analyzing first sequence of identifiers based on a sequential event model, wherein the sequential event model is trained based on a second sequence of identifiers linked to a second series of valid logged event types, with the second series of valid logged event record types corresponding to computing events of performant operation of a computing system.

13. The method as claimed in claim 12, wherein the sequential event model comprises a probability table bearing a probability value of occurrence of a successive event following a given current event.

14. A non-transitory computer-readable medium comprising instructions, the instructions being executable by a processing resource to:

obtain a log file comprising a plurality of event records;

process a set of event records from the log file to determine a first series of logged event types and a first series of corresponding logged event attributes;

associate a numerical identifier with each logged event type within the first series of logged event types, to provide a first sequence of identifiers;

obtain a retrace dictionary based on the first sequence of identifiers, wherein the retrace dictionary links each numerical identifier in the first sequence of identifiers with a corresponding event record within the set of event records;

determine whether a selected numerical identifier within the first sequence of identifiers corresponds to occurrence of anomalous computing event; and based on the retrace dictionary, identify an event record corresponding to the selected numerical identifier within the log file, as anomalous.

15. The non-transitory computer-readable medium as claimed in claim 14, wherein to determine whether the selected numerical identifier corresponds to occurrence of anomalous computing event, the instructions are to further:

analyze first sequence of identifiers based on a sequential event model, wherein the sequential event model is trained based on a second sequence of identifiers linked to a second series of valid logged event types, with the second series of valid logged event record types corresponding to computing events of performant operation of a computing system.

16. The non-transitory computer-readable medium as claimed in claim 15, wherein the sequential event model comprises a probability table bearing a probability value of occurrence of a successive event following a given current event.

17. The non-transitory computer-readable medium as claimed in claim 14, wherein to associate the numerical identifier with each logged event type, the instructions are to:

evaluate a hash value with each logged event type within the first series of logged event types; and associating a numerical identifier to the hash value to provide the first series of logged event types.

18. The non-transitory computer-readable medium as claimed in claim 14, wherein the instructions are to further:

identify another event record corresponding to the selected numerical identifier within the log file, as anomalous; and clustering the event record and the other record into one of a plurality of root cause clusters.

19. The non-transitory computer-readable medium as claimed in claim 18, the instructions are to further identify a root cause of the anomalous event record and the other event record, based on the clustering.

20. The non-transitory computer-readable medium as claimed in claim 18, wherein the clustering of the anomalous event record and the other event record is based on a k-nearest neighbours (k-NN) based model.

* * * * *